United States Patent
Maruyama

[11] Patent Number: 6,130,994
[45] Date of Patent: Oct. 10, 2000

[54] INTERCHANGEABLE ZOOM LENS, AN ELECTRONIC STILL CAMERA, AND A SILVER SALT FILM CAMERA

[75] Inventor: Atsushi Maruyama, Sagamihara, Japan

[73] Assignee: Olympus Optical Co., Ltd., Tokyo, Japan

[21] Appl. No.: 09/365,750

[22] Filed: Aug. 3, 1999

[30] Foreign Application Priority Data

Aug. 7, 1998 [JP] Japan ................... 10-224598

[51] Int. Cl.⁷ ................................................ G03B 17/00
[52] U.S. Cl. ........................ 396/60; 396/72; 396/529; 348/240; 348/358
[58] Field of Search ....................... 396/60, 72, 529; 348/240, 358

[56] References Cited

U.S. PATENT DOCUMENTS

| Re. 32,797 | 12/1988 | Harvey | 396/60 |
| 4,583,831 | 4/1986 | Harvey | 396/60 |

FOREIGN PATENT DOCUMENTS

| 5-130478 | 5/1993 | Japan . |
| 10-10405 | 1/1998 | Japan . |

*Primary Examiner*—W. B. Perkey
*Attorney, Agent, or Firm*—Pillsbury Madison & Sutro LLP

[57] ABSTRACT

An interchangeable zoom lens is shown which includes: a mount portion for mounting a camera body; a zoom operation member; optical zoom device for varying focal length of the zoom lens in response to operation of the zoom operation member; and signal output device provided on the mount portion for outputting a predetermined signal when the optical zoom device is in a tele-end position and when longer focal length is requested by the zoom operation member. An electronic still camera body and a silver salt film camera body for utilizing the zoom lens are also shown. The electronic still camera body carries out an electronic zoom operation on receiving the predetermined signal from the zoom lens. The silver salt film camera body carries out recording trimming print data onto a silver salt film on receiving the predetermined signal from the zoom lens.

15 Claims, 7 Drawing Sheets

| NO | CONTENTS |
|---|---|
| 1 | CURRENT FOCAL LENGTH |
| 2 | OPTICAL ZOOM RANGE |
| 3 | ROTATION ANGLE IN OPTICAL ZOOM |
| 4 | ROTATION ANGLE IN ELECTRONIC ZOOM |
| 5 | MAGNIFICATION DATA |

INTERCHANGEABLE ZOOM LENS, AN ELECTRONIC STILL CAMERA, AND A SILVER SALT FILM CAMERA

This application claims priority from application No. Hei 10-224,598 filed in Japan on Aug. 7, 1998, the contents of which are hereby incorporated by reference.

BACKGROUND OF THE INVENTION

1. Field of the Invention

The present invention relates to a camera system including an inter changeable zoom lens and either one of an electronic still camera body or a silver salt film camera body, wherein both of the camera bodies are capable of mounting the interchangeable zoom lens.

2. Description of Related Art

An interchangeable zoom lens, which is capable of varying focal length, is widely used not only for a silver salt film camera, but also for an electronic still camera. Recently, some kind of technology have been developed to allow common use such an interchangeable zoom lens available for both of the silver salt film camera and the electronic still camera. For example, Japanese Laid-Open Patent Application No.5-130478 discloses an art which concerns an electronic still camera having a function for selecting a predetermined image magnification from among predetermined magnification data, the function is called as an electronic zoom. The art utilizes both the optical zoom and the electronic zoom to obtain continuous smooth image magnification. Japanese Laid-Open Patent Application No. 10-10405 discloses an art which concerns an electronic still camera capable of mounting an interchangeable zoom lens. The zoom lens has a zoom ring for enabling the optical zoom on its lens barrel, and the electronic still camera has an electronic zoom button on the camera body.

In the former art, However, both of the optical zoom operation and the electronic zoom operation are separately required, so that the camera operation is not so easy. In the latter art, the zoom ring is provided on the lens barrel while the electronic zoom button is provided on the camera body, so that camera operation is not so easy, too.

SUMMARY OF THE INVENTION

The first object of the present invention is to provide an interchangeable zoom lens which enables both of an optical zoom operation and outputting an electronic zoom information.

To achieve the above object, an interchangeable zoom lens according to the present invention includes: a mount portion for mounting a camera body; a zoom operation member; an optical zoom mechanism for varying focal length of the zoom lens in response to operation of the zoom operation member; and a signal output circuit provided on the mount portion for outputting a predetermined signal when the optical zoom mechanism is in a tele-end position and when longer focal length is requested by the zoom operation member.

The second object of the present invention is to provide an electronic still camera capable of mounting the interchangeable zoom lens, the camera activates the electronic zoom operation in response to receiving the electronic zoom information received from the zoom lens.

To achieve the above object, an electronic still camera according to the present invention includes: a mount portion which accepts an interchangeable zoom lens having a zoom ring, an optical zoom mechanism for varying focal length of the lens according to an operation of the zoom ring, and a signal output circuit for outputting a predetermined signal when the zoom ring is operated excess of tele-end of the optical zoom mechanism; a communication circuit for communicating with the interchangeable zoom lens via the mount portion; and a circuit for activating an electronic zoom operation in response to the predetermined signal received from the signal output circuit.

The third object of the present invention is to provide a silver salt film camera capable of mounting the interchangeable zoom lens, the camera records trimming print information received from the zoom lens.

To achieve the above object, a silver salt film camera according to the present invention includes: a mount portion which accepts an interchangeable zoom lens having a zoom ring, an optical zoom mechanism for varying focal length of the lens according to an operation of the zoom ring, and a signal output circuit for outputting a predetermined signal when the zoom ring is operated excess of tele-end of the optical zoom mechanism; a communication circuit for communicating with the interchangeable zoom lens via the mount portion; a circuit for determining a trimming print information; and a recording circuit for recording the trimming print information onto a silver salt film loaded in the camera.

These and other objects and features of this invention will be better understood by reading the description of the preferred embodiments as given below.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

The preferred embodiments of the present invention is described below with reference to the drawings annexed hereto.

Figure 1:
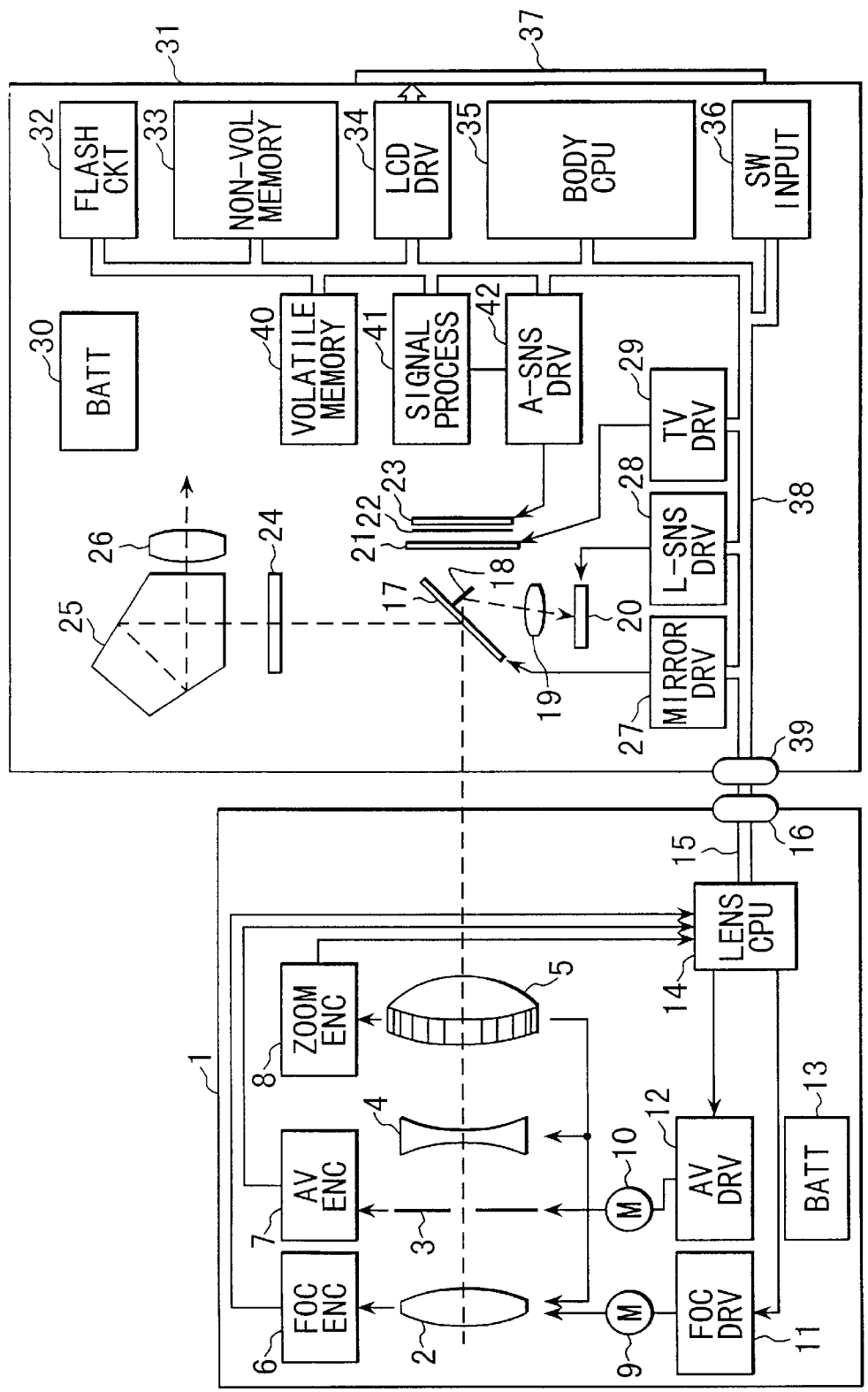
FIG. 1 illustrates a block diagram showing a combination of an interchangeable zoom lens and an electronic still camera according to the first embodiment of the present invention.

FIG. 1 illustrates a block diagram showing a combination of an interchangeable zoom lens 1 and an electronic still camera body 31 according to the first embodiment of the present invention. First of all, structure of the interchangeable zoom lens 1 is described. In FIG. 1, the interchangeable zoom lens 1 is a zoom lens which can be mounted on the electronic still camera body 31. In the lens 1, there is provided a taking lens for forming an object image including a convex lens 2 and a concave lens 4. An aperture diaphragm mechanism 3, provided between the convex lens 2 and the concave lens 4, is driven by a motor 10 which is controlled by an aperture drive circuit (Av Drv) 12. An initial position and a stop position of the aperture diaphragm 3 are detected by an aperture encoder (Av Enc) 7, the detected positional information is inputted into a lens CPU 14 to feed back the aperture drive circuit (Av Drv) 12.

The convex lens 2 is driven by a lens motor 9 which is controlled by a focus drive circuit (Foc Drv) 11, an initial position and a stop position of the convex lens 2 are detected by a focus encoder (Foc Enc) 6. The detected positional information is inputted into a lens CPU 14 to feed back the focus drive circuit (Foc Drv) 11. A zoom ring 5 is an operation member for activating actual or electronic (virtual) zoom, the taking lens including the convex lens 2 and the concave lens 4 move as rotating the zoom ring 5 to vary focal length thereof. A zoom ring encoder (Zoom Enc) 8 detects operation angle from an initial (wide-end) position of the zoom ring 5, the detected angle information is inputted into the lens CPU 14.

A lens battery (Batt) 13 is provided in the lens 1, the lens battery (Batt) 13 supplies electric power to the circuits and the motors in the lens 1. The lens CPU 14 controls the focus drive circuit (Foc Drv) 11 and the aperture drive circuit (Av Drv) 12 based on the outputs of the focus encoder (Foc Enc) 6, the aperture encoder (Av Enc) 7, and the zoom ring encoder (Zoom Enc) 8. The lens CPU 14 makes various communication with a camera body 31 via a communication line 15 and a contact 16.

Next, structure of the electronic still camera body 31 is described. In FIG. 1, an object light passed through the interchangeable zoom lens 1 incidents upon a swingable main mirror 17 a center portion of which has a half mirror. A swingable sub-mirror 18 is attached onto the back center portion of the main mirror 17, the sub-mirror 18 reflects center portion of the incident light downwardly. A separator optical system 19, aligned along a perpendicular plane to the drawing, for separating incident light into a pair of lights is provided in an optical path reflected by the sub-mirror 18. The separator optical system 19 focuses a pair of images of the object on a line sensor 20 connected to a sensor drive circuit (L-SNS Drv) 28. A well-known phase difference type focus detecting device is constructed by the sub-mirror 18, the separator optical system 19, and the line sensor 20.

A body CPU 35 calculates relative spacing of the pair of images formed on the image sensor 20 based on an output signal of the sensor drive circuit (L-SNS Drv) 28, and calculates drive amount of the convex lens 2 to achieve in-focus condition. The body CPU 35 transmits the drive amount to the lens CPU 14 via a data bus 38 and a contact 39. The lens CPU 14 adjusts focus of the taking lens.

A focusing screen 24, a pentagonal roof prism 25, and a finder eyepiece 26 are respectively arranged in an optical path of a reflected light of the main mirror 17, thus an optical view finder device is constructed. There are two finder devices in the camera, one is a monitor panel 37 as an EVF (Electronic View Finder) device and the other is the optical view finder device. It is preferable to use the optical view finder device when taking picture image because the camera can be held steadily so that camera bluer can be reduced much more than using the EVF device. The main mirror 17 is driven by a mirror drive circuit (Mirror Drv) 27, and the shutter 21 is driven by a shutter drive circuit (Tv Drv) 29. An optical low-pass filter 22 and an area sensor 23 for imaging object are arranged behind the shutter 21.

After swinging the main mirror 17 up and the shutter 21 begins to travel, image of the object is formed on the area sensor 23 and begins to image at a predetermined timing. The shutter 21 closes after finishing imaging of the area sensor 23. The area sensor 23 is driven by a sensor driver circuit (A-SNS Drv) 42 to output an analogue image signal to a signal process circuit (Signal Process) 41. The signal process circuit (Signal Process) 41 executes a predetermined signal process including analogue to digital signal conversion. The signal process circuit (Signal Process) 41 is connected to the data bus 38. The signal process circuit (Signal Process) 41 transmits a processed image signal to a volatile memory 40 and a non-volatile memory (non-Vol. memory) 33. The image signal stored in the volatile memory 40 is transmitted to a LCD (Liquid Crystal Display) drive circuit (LCD Drv) 34 to display the image on the monitor panel 37. The non-volatile memory (non-Vol. memory) 33 is a detachable re-writable memory. The non-volatile memory (non-Vol. memory) 33 is used for storing object images because the object image stored in the non-volatile memory remains without applying electric power.

A body battery (Batt) 30 is provided in the camera body 31, the body battery (Batt) 30 supplies electric power to the circuits in the camera 31. A switch input circuit (SW Input) 36 includes a plurality of operation switches and mechanical detection switches (not shown). A flash circuit (Flash CKT) 32 for flashing the object is provided in the camera body 31 to flash when the body CPU 35 determines that object luminance is less than a predetermined level. The object luminance is measured by the area sensor drive circuit (A-SNS Drv) 42. The area sensor drive circuit (A-SNS Drv) 42, the signal process circuit (Signal Process) 41, the flash circuit (Flash CKT) 32, the non-volatile memory (non-Vol. memory) 33, the volatile memory 40, the LCD drive circuit (LCD Drv) 34, the switch input circuit (SW Input) 36, the body CPU 35, the shutter drive circuit (Tv Drv) 29, the line sensor drive circuit (L-SNS Drv) 28, and the mirror drive circuit (Mirror Drv) 27 are sharing the data bus 38, so that interactive communications are available via the data bus 38. The body CPU 35 controls the overall operation sequence of the camera 31.

Figure 2:
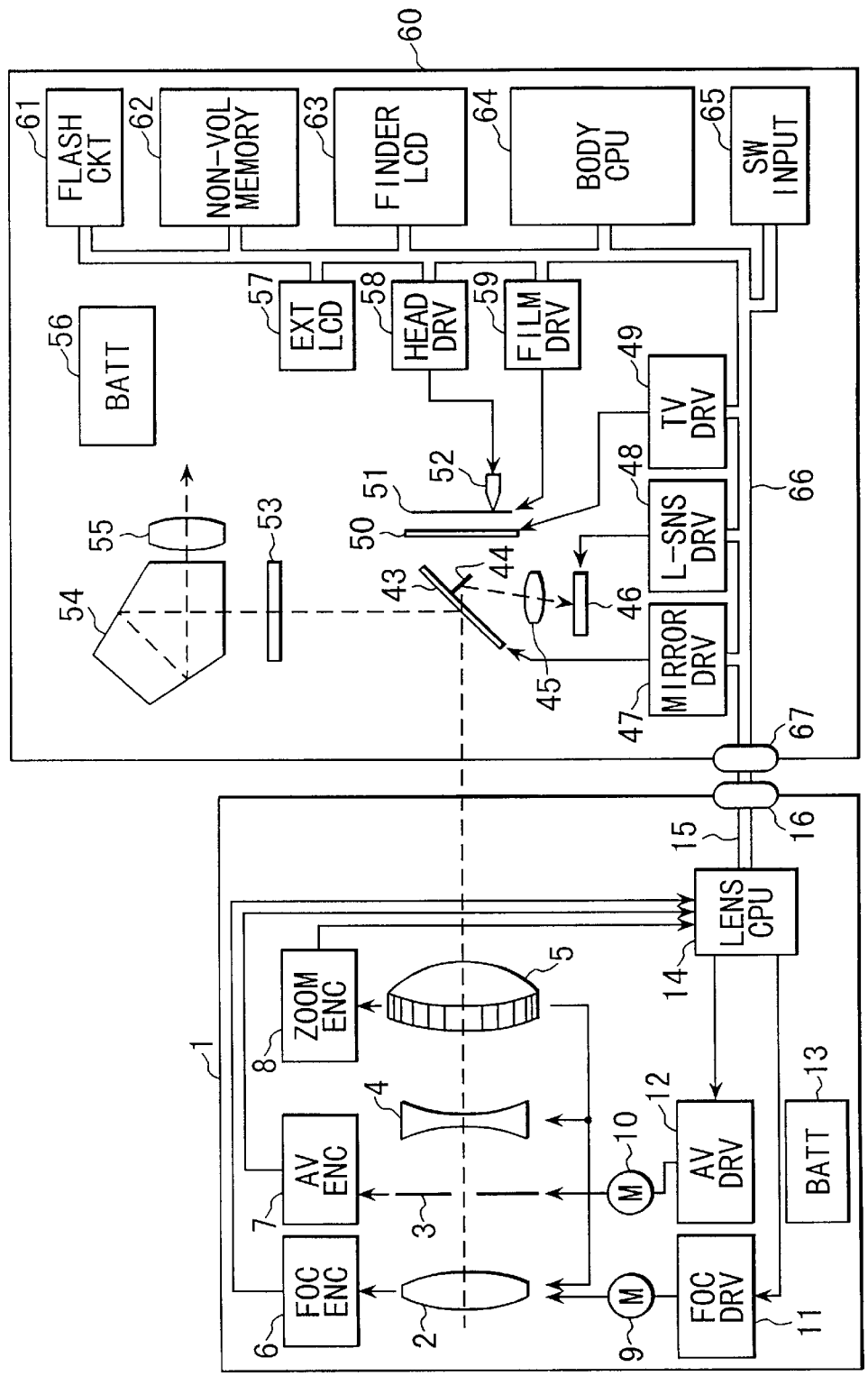
FIG. 2 illustrates a block diagram showing a combination of an interchangeable zoom lens and a silver salt film camera according to the second embodiment of the present invention.

FIG. 2 illustrates a block diagram showing a combination of the interchangeable zoom lens 1 and a silver salt film camera body 60 according to the second embodiment of the present invention. The interchangeable zoom lens 1 is identical to that of the first embodiment. In the camera body 60, a focusing screen 53, a pentagonal roof prism 54, a finder eye piece 55, a half mirror 44, a separator optical system 45, a line sensor 46, a line sensor drive circuit (L-SNS Drv) 48, a flash circuit (Flash CKT) 61, a switch input circuit (SW Input) 65, and a camera battery (Batt) 56 are respectively identical to that of the first embodiment, so that further detailed descriptions for above elements are omitted.

A swingable main mirror 43 is driven by a mirror drive circuit (Mirror Drv) 47, and a shutter 50 is driven by a shutter drive circuit (Tv Drv) 49. After swinging the main mirror 43 up and the shutter 50 begins to travel, image of the object is formed on a silver salt film 51 and begins to expose at a predetermined timing. A body CPU 64 calculates proper exposure settings for the silver salt film 51 based on a luminance of the object detected by a light metering circuit (not shown) and a film speed detected by an information detector circuit (not shown). The body CPU 64 calculates proper setting values for the aperture diaphragm 3 and the shutter 50. The aperture setting value is transmitted from the camera body 60 to the lens 1, and the aperture diaphragm 3 is controlled by the lens CPU 14.

The silver salt film 51 has a magnetic recording track, and a magnetic head 52 is arranged to record magnetic information onto the magnetic track of the film 51. The magnetic head 52 is driven by a head drive circuit (Head Drv) 58. A film feeder circuit (Film Drv) 59 winds up a frame of the film 51 after shooting every frame. The magnetic recording operation by the magnetic head 52 is carried out while the film 51 is wound up. An external LCD panel (Ext LCD) 57 is a display device for displaying such as frame number of the film 51 and an exposure mode of the camera 60. A finder LCD 63, provided in the optical path of the optical view finder, is a display device for displaying the setting values of the aperture diaphragm 3 and the shutter 50. A trimming print information, which will be described later, is also displayed on the external LCD panel (Ext LCD) 57 or on the finder LCD 63. A non-volatile memory (non-Vol. memory) 62 stores various adjust data and operation status information such as film rewind operation is in progress.

The flash circuit (Flash CKT) 61, the non-volatile memory (non-Vol. memory) 62, the body CPU 64, the head drive circuit (Head Drv) 58, the film feeder circuit (Film Drv) 59, the shutter drive circuit (Tv Drv) 49, the line sensor drive circuit (L-SNS Drv) 48, the mirror drive circuit (Mirror Drv) 47, the external LCD panel (Ext LCD) 57, and the finder LCD 63 are sharing the data bus 66, thus interactive communications are available via the data bus 66. The body CPU 64 controls the overall operation sequence of the camera 60.

Figure 3:
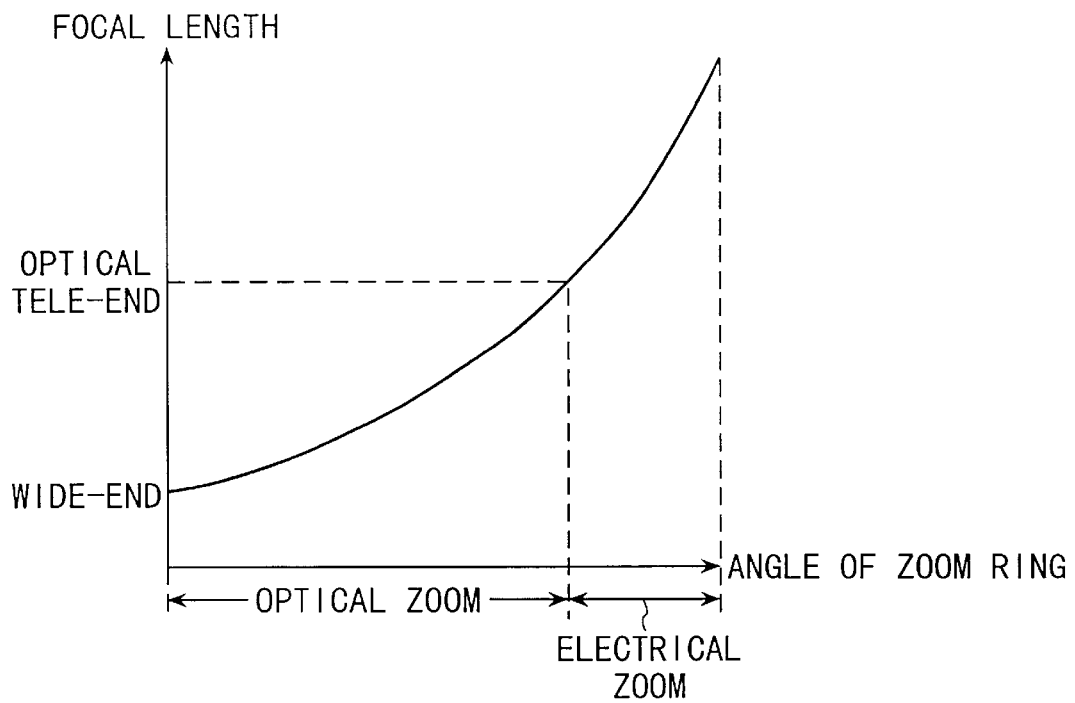
FIG. 3 illustrates a graph showing a relation between the focal length and the rotation angle of the zoom ring 5 when the zoom lens 1 is mounted on the electronic still camera body 31.

FIG. 3 illustrates a graph showing a relation between the focal length and the rotation angle of the zoom ring 5 when the zoom lens 1 is mounted on the electronic still camera body 31. The focal length increases from a wide-end value according to a rotation angle of the zoom ring 5. When the zoom mechanism in the lens 1 reaches a tele-end portion and when the zoom ring 5 is rotated further angle, a predetermined signal is generated and transmitted to the camera body 31 to cause electronic zoom operation according to the rotation angle of the zoom ring 5. In the electronic zoom operation, the optical focal length is kept at the tele-end value, however, the body CPU 35 calculates the image magnification based on the predetermined signal transmitted from the lens 1, and causes the LCD panel 37 to display magnified image. Thus, the optical zoom and the electronic zoom are performed sequentially as rotating the zoom ring 5.

Figure 4:
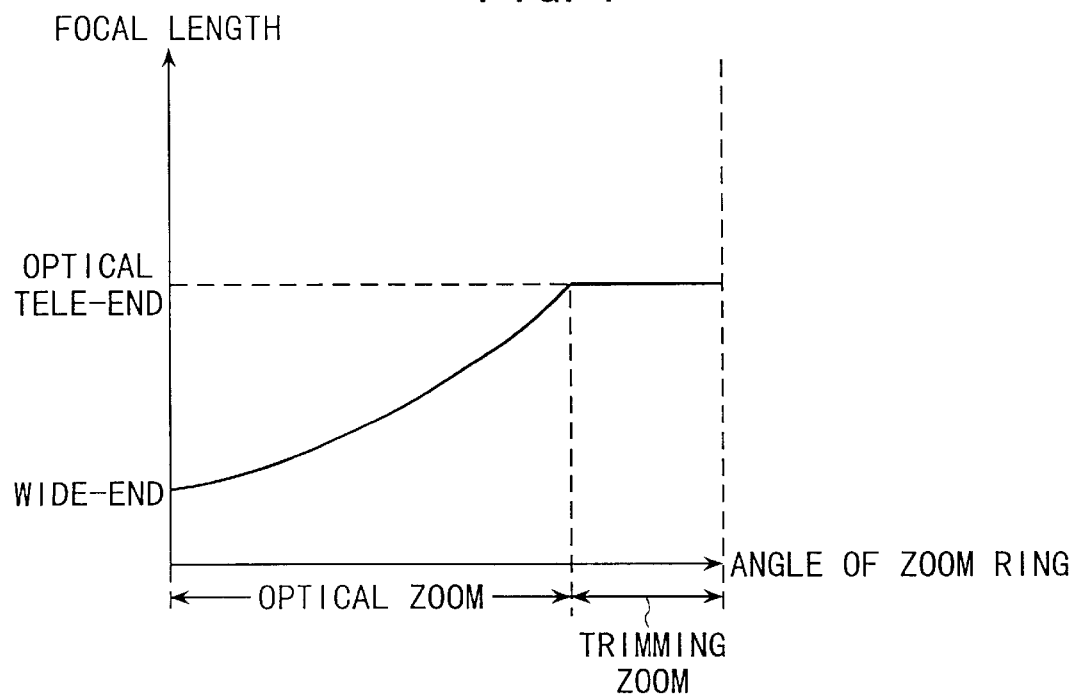
FIG. 4 illustrates a graph showing a relation between the focal length and the rotation angle of the zoom ring 5 when the zoom lens 1 is mounted on the silver salt film camera body 60.

FIG. 4 illustrates a graph showing a relation between the focal length and the rotation angle of the zoom ring 5 when the zoom lens 1 is mounted on the silver salt film camera body 60. The focal length also increases from a wide-end value according to a rotation angle of the zoom ring 5. When the zoom mechanism in the lens 1 reaches the tele-end portion and when the zoom ring 5 is rotated further angle, a predetermined signal is generated and transmitted to the camera body 60, however, the focal length does not vary no longer. In this case, the body CPU 64 calculates trimming print magnification in response to the predetermined signal transmitted from the lens 1, and causes the magnetic head 52 to record the trimming print information on the silver salt film 51 loaded in the camera body 60. Thus, the optical zoom and recording of the trimming information are performed sequentially as rotating the zoom ring 5.

Figures 5, 6:
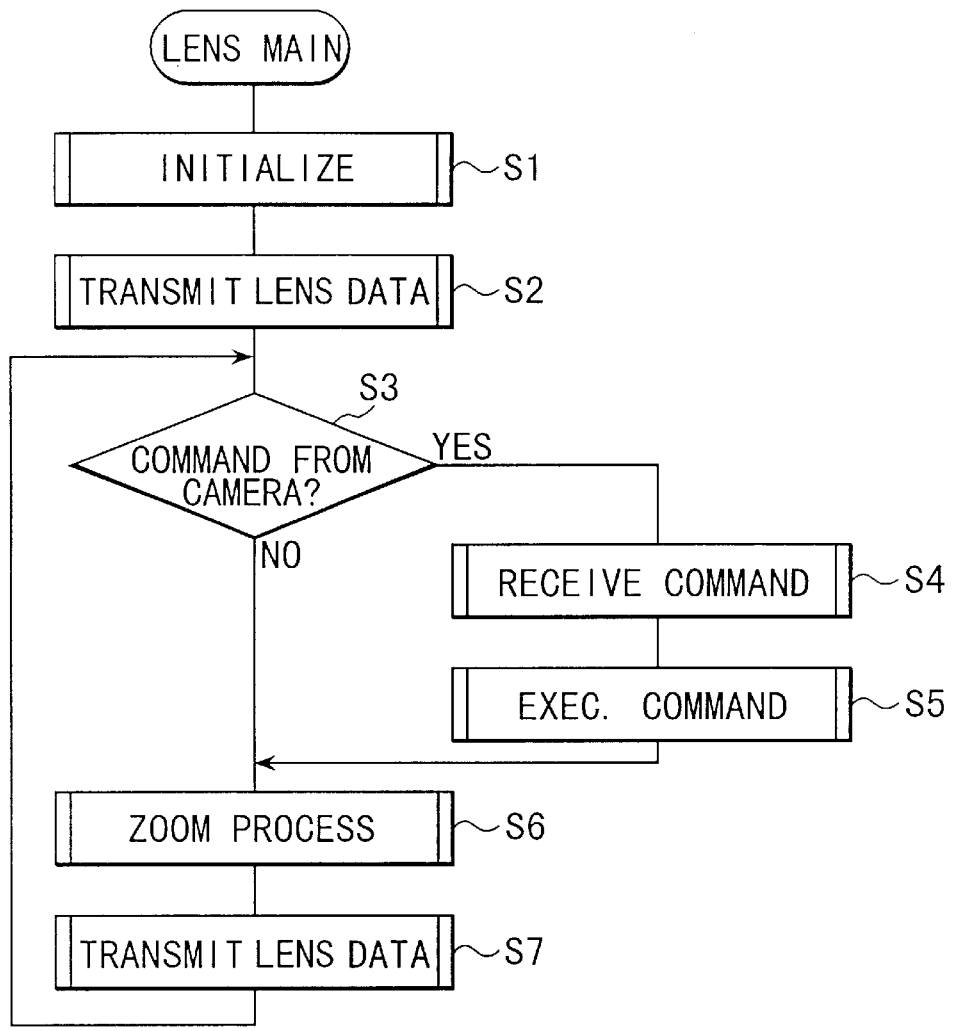
FIG. 5 illustrates a flow chart showing a main routine of the lens CPU 14.
FIG. 6 illustrates a table showing contents of lens data transmitted from the lens 1 to the camera body 31 or 60 in the step S7 in FIG. 5.

FIG. 5 illustrates a flow chart showing a main routine of the lens CPU 14. On mounting the interchangeable zoom lens 1 onto ether a camera body 31 or camera body 60, this subroutine is called. In this routine, at first, various hardware resources of the lens CPU 14 including RAM (Random Access memory) and I/O (Input/Output) ports, which are not shown, are respectively initialized (S1). Specific optical data of the lens including an effective aperture value, transmission rate and information concerning auto-focusing operation are transmitted to the camera body 31 or 60 (S2). The lens CPU 14 determines if a communication request command is sent from the camera body 31 or 60 (S3). If the communication request command is sent from the camera body 31 or 60, then the lens CPU 14 receives the command (S4) and executes the command (S5). The flow proceeds to step S6. If the communication request command is not sent from the camera body 31 or 60 in step S3, then a zoom process routine, which will be shown in FIG. 7 (S6), is called to send various lens data shown in FIG. 6 to the camera body 31 or 60 (S7). The flow returns to the step S3.

FIG. 6 illustrates a table showing contents of lens data transmitted from the lens 1 to the camera body 31 or 60 in the step S7 in FIG. 5. The data are a current focal length derived from information read from the zoom ring encoder (Zoom Enc) 8 (No.1), the range of the optical zoom mechanism (No.2), current rotation angle of the zoom ring 5 in the optical zoom region (No.3), current rotation angle of the zoom ring 5 in the electronic or virtual zoom region (No.4), and an information concerning to the image magnification (No.5), respectively. In this embodiment, the information concerning to the image magnification (No.5) is transmitted from the lens 1 to the camera body 31 or 60, however, it may be calculated in the camera body 31 or 60 based on the other data No. 1 to No.4.

Figure 7:
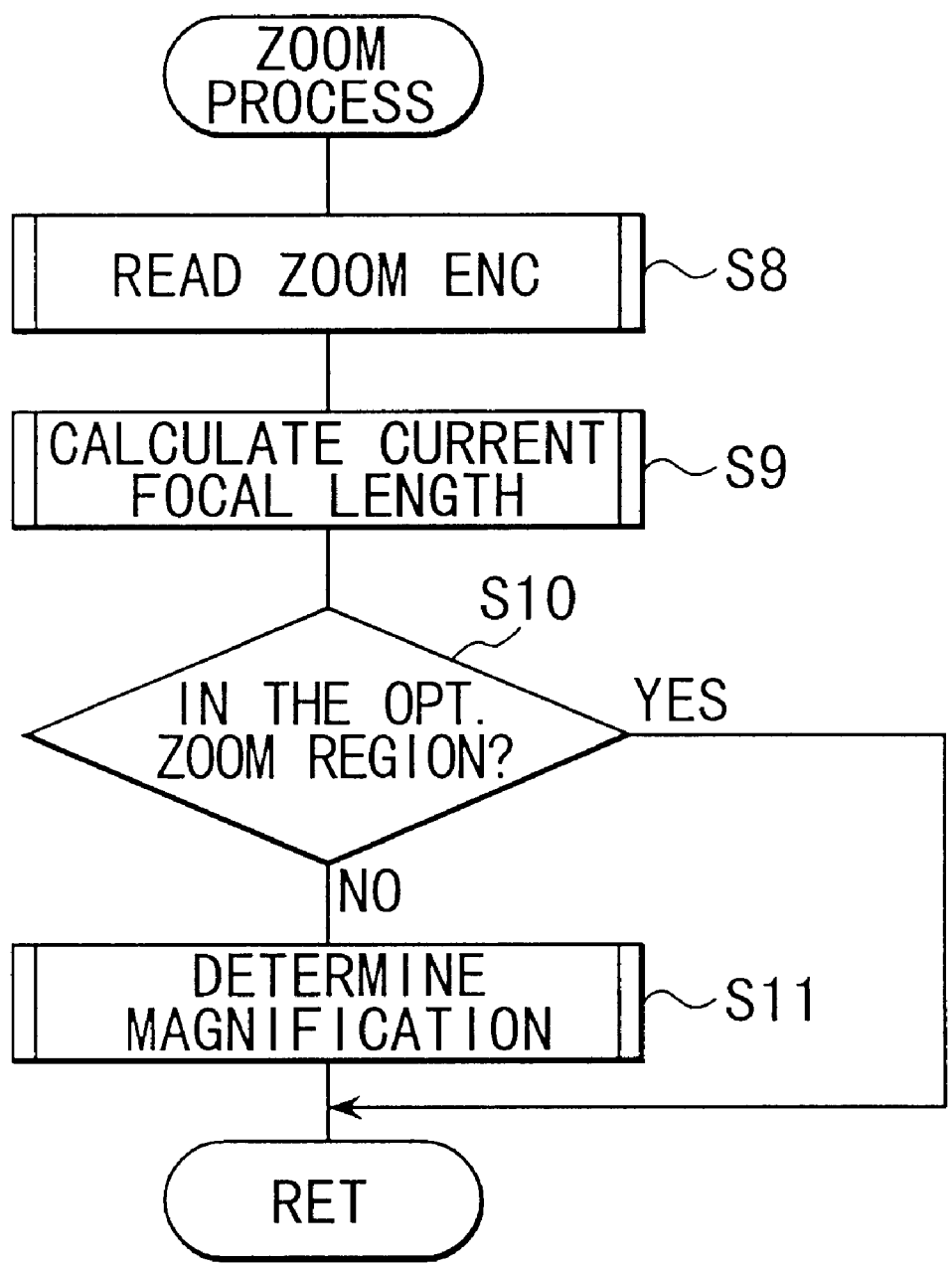
FIG. 7 illustrates a flow chart showing a subroutine "zoom process" executed in the step S6 in FIG. 5.

FIG. 7 illustrates a flow chart showing a subroutine "zoom process" executed in the step S6 in FIG. 5. The lens CPU 14 reads the zoom ring encoder (Zoom Enc) 8 (S8), calculate current focal length based on the read data from the encoder (Zoom Enc) 8 (S9), and determines if the zoom mechanism is in the optical zoom region (S10). If the zoom mechanism is in the optical zoom region, then the flow returns to the main routine. On the other hand, if the zoom mechanism is not in the optical zoom region, then the lens CPU 14 determines electronic or virtual zoom magnification by executing a predetermined calculation (S11). The flow returns to the main routine.

The predetermined calculation carried out in the step S11 may be done by calculating magnification of the electronic zoom according to rotation angle of the zoom ring 5 so as to yield substantially same focal length change as in the optical zoom region, by setting fixed magnification data per unit rotation angle of the zoom ring 5 in the electronic zoom region, or by selecting suitable magnification data according to the rotation angle of the zoom ring 5 from a data table stored in RAM of the lens CPU 14.

Figure 8:
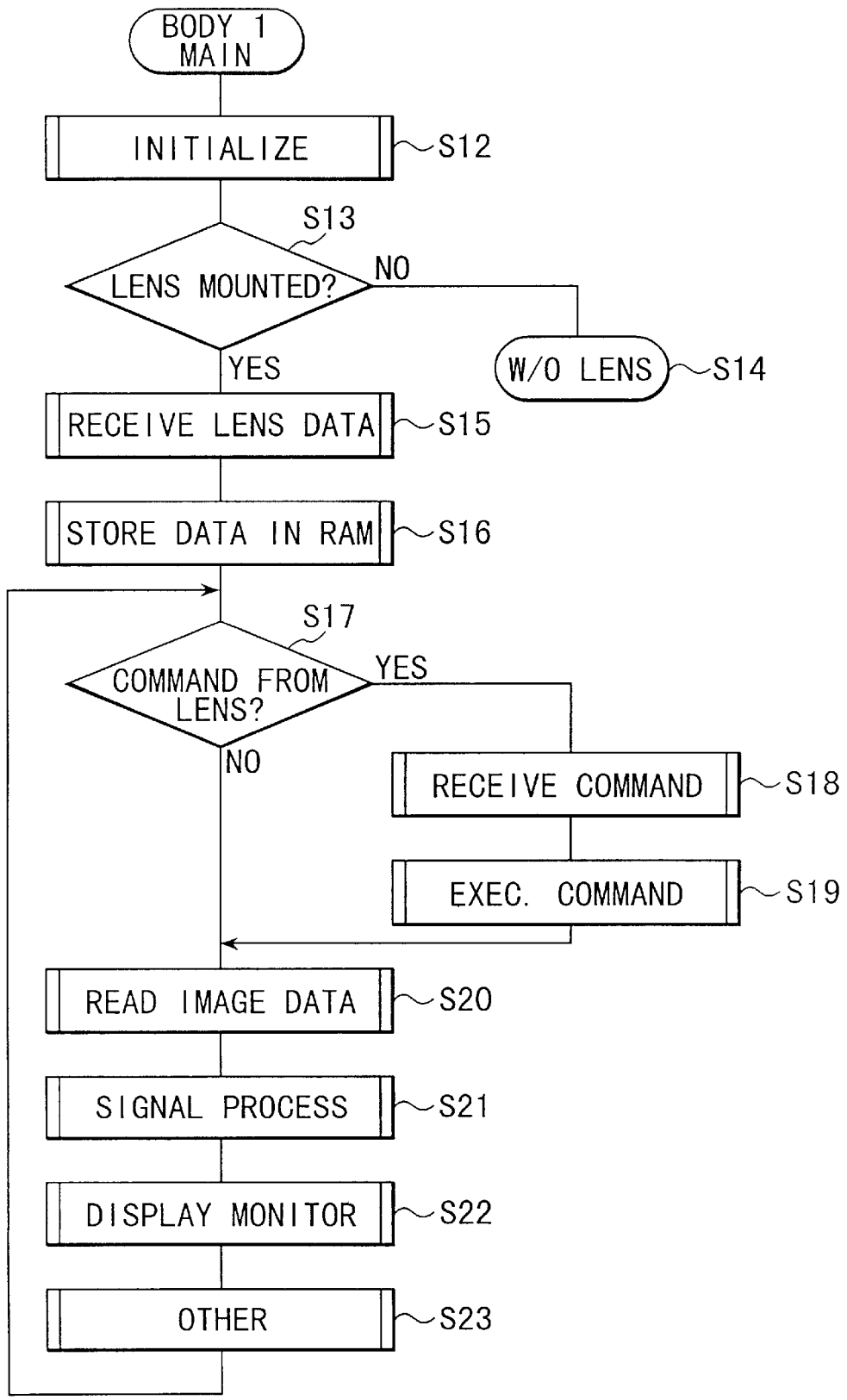
FIG. 8 illustrates a flow chart showing a main routine of the body CPU 35 in the electronic still camera 31.

FIG. 8 illustrates a flow chart showing a main routine of the body CPU 35 in the electronic still camera 31. This routine is called when a power switch (not shown) is turned on, or when the interchangeable lens 1 is mounted. In this routine, at first, various hardware resources of the body CPU 35 including RAM (Random Access memory) and I/O (Input/Output) ports, which are not shown, are respectively initialized (S12). The body CPU 35 determines if the interchangeable lens 1 is mounted (S13). If the interchangeable lens 1 is not mounted, then the flow proceeds to a sequence without lens (S14). The sequence without lens has no relation to the present invention, so that no description is given for the sequence. If the interchangeable lens 1 is mounted, then the body CPU 35 receives the specific data of the lens 1 transmitted from the lens 1 (S15), stores the received data into RAM (S16), and determines if the communication request command is sent from the lens 1 (S17).

If the communication request command is sent from the lens 1, then the body CPU35 receives the command (S18) and executes the command (S19). The flow proceeds to step S20. If the communication request command is not sent from the lens 1, then the body CPU 35 receives the image signal from the area sensor 42 (S20). The signal process circuit (Signal Process) 41 executes the predetermined signal process for the received image signal to output the digital image data, and stores the digital image data into the volatile memory 40 (S21). In this case, if the magnification data for the electronic zoom has been received, then the signal process circuit (Signal Process) 41 processes that the digital image data has the given magnification and stores the enlarged image data into the volatile memory 40. The body CPU 35 causes the monitor 37 to display the digital image data stored in the volatile memory 40 (S22), and executes other process on demand (S23). The flow returns to step S17.

Figure 9:
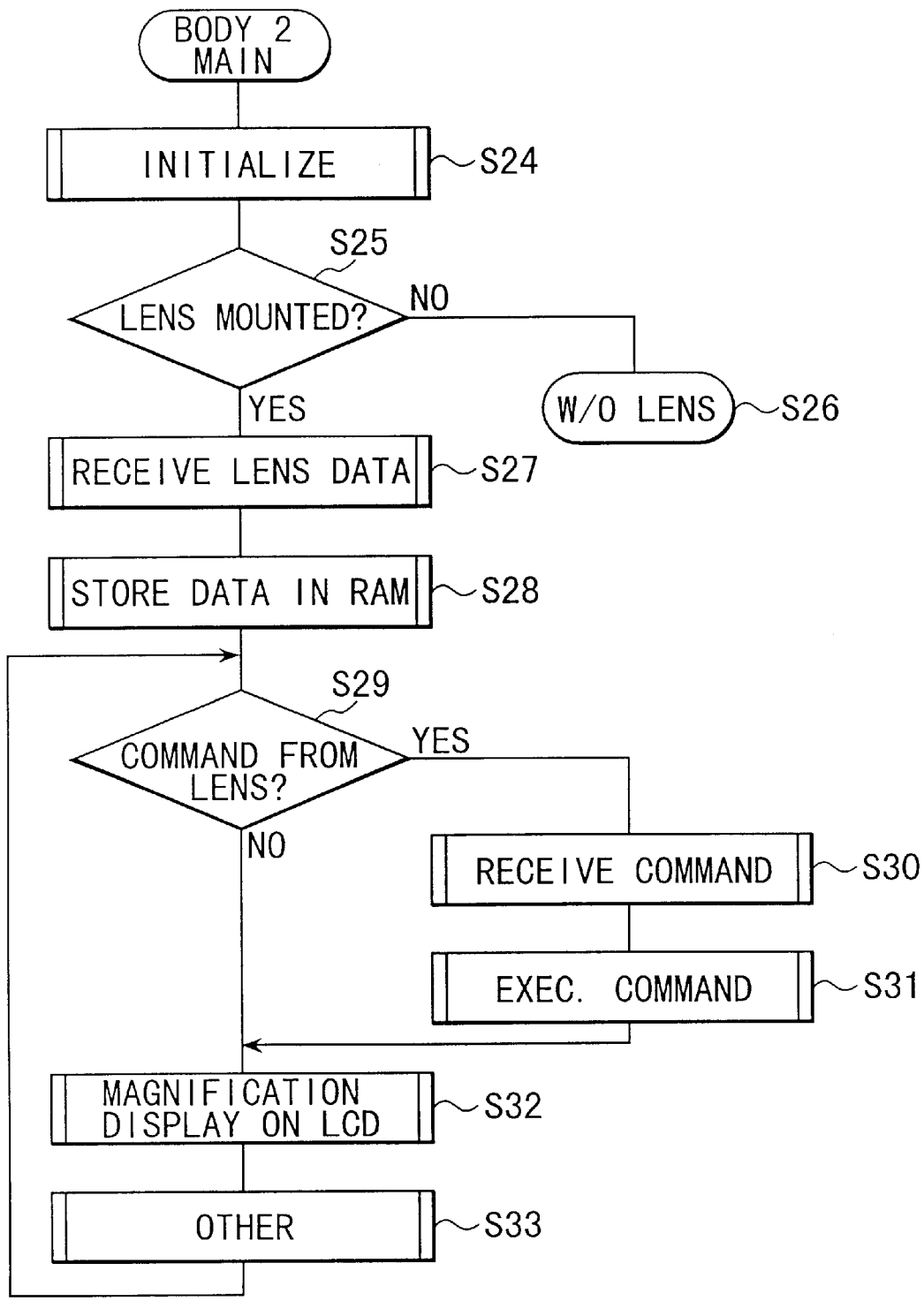
FIG. 9 illustrates a flow chart showing a main routine of the body CPU 64 in the silver salt film camera 60.

FIG. 9 illustrates a flow chart showing a main routine of the body CPU 64 in the silver salt film camera 60. This routine is called when a power switch (not shown) is turned on, or when the interchangeable lens 1 is mounted. In this routine, at first, various hardware resources of the body CPU 64 including RAM (Random Access memory) and I/O (Input/Output) ports, which are not shown, are respectively initialized (S24). The body CPU 64 determines if the interchangeable lens 1 is mounted (S25). If the interchangeable lens 1 is not mounted, then the flow proceeds to a sequence without lens (S26). The sequence without lens has no relation to the present invention, so that no description is given for the sequence. If the interchangeable lens 1 is mounted, then the body CPU 64 receives the specific data of the lens 1 transmitted from the lens 1 (S27), stores the received data into RAM (S28), and determines if the communication request command is sent from the lens 1 (S29). If the communication request command is sent from the lens 1, then the body CPU 64 receives the command (S30) and executes the command (S31). The flow proceeds to the step S32. The body CPU 64 causes the external LCD panel (Ext LCD) 57 to display information of magnification or trimming print (S32), and executes other process on demand (S33). The flow returns to the step S29.

In this case, the magnification or trimming print information is recorded on the magnetic track of the silver salt film 51 while being wound up after film exposure. The magnification data displayed on the external LCD panel (Ext LCD) 57 may be a numerical data concerning magnification data itself, or a data interpreted into the focal length. The finder LCD 63 may also display the magnification data and/or a trimming frame thereon.

The above described preferred embodiments are intended to illustrate the principles of the invention, but not to limit the scope of the invention. Various other embodiments and modifications to these preferred embodiments may be made by those skilled in the art, without departing from the scope of the following claims.

What is claimed is:

1. An interchangeable zoom lens comprising:
   a mount portion for mounting a camera body;
   a zoom operation member;
   optical zoom means for varying focal length of the zoom lens in response to operation of the zoom operation member; and
   signal output means provided in the mount portion for outputting a predetermined signal when the optical zoom means is in a tele-end position and when longer focal length is requested by the zoom operation member.

2. An electronic still camera having an electronic imager capable of electronic zoom, the camera comprising:
   a mount portion for mounting an interchangeable zoom lens having a zoom ring, optical zoom means for varying focal length of the lens according to an operation of the zoom ring, and signal output means for outputting a predetermined signal when the zoom ring is operated excess of tele-end of the optical zoom means;
   communication means for communicating with the interchangeable zoom lens via the mount portion; and
   means for activating an electronic zoom operation in response to the predetermined signal received from the signal output means.

3. A silver salt film camera capable of recording trimming print information, the camera comprising:
   a mount portion for mounting an interchangeable zoom lens having a zoom ring, optical zoom means for varying focal length of the lens according to an operation of the zoom ring, and signal output means for outputting a predetermined signal when the zoom ring is operated excess of tele-end of the optical zoom means;
   communication means for communicating with the interchangeable zoom lens via the mount portion;
   means for determining a trimming print information based on the predetermined signal received from the signal output means; and
   recording means for recording the trimming print information onto a silver salt film loaded in the camera.

4. An electronic still camera capable of electronic zoom, the camera comprising:
   a mount portion for mounting an interchangeable zoom lens having a zoom ring, the zoom lens having an optical zoom region in which an optical zooming is activated and a virtual zoom region in which an angular displacement of the zoom ring is detected;
   communication means for communicating with the interchangeable zoom lens via the mount portion; and
   means for determining a zoom magnification in response to receiving the angular displacement of the zoom ring and for activating an electronic zoom operation based on the zoom magnification.

5. An electronic still camera capable of electronic zoom, the camera comprising:
   a mount portion for mounting an interchangeable zoom lens having a zoom ring, the zoom lens having an optical zoom region in which an optical zooming in a predetermined optical zoom ratio is activated and a virtual zoom region in which a first angular displacement of the zoom ring in the optical zoom region and a second angular displacement of the zoom ring in the virtual zoom region is respectively detected;
   communication means for communicating with the interchangeable zoom lens via the mount portion; and
   means for activating an electronic zoom operation based on the predetermined optical zoom ratio and the first and second angular displacements of the zoom ring.

6. An interchangeable zoom lens comprising:

a mount portion for mounting a camera body;

a zoom optical system having a predetermined optical zoom range;

a rotational operation member, having an optical zoom region in the predetermined optical zoom range and a trimming zoom region in which a trimming zoom information is generated in response to a further operation of the operation member after the zoom optical system reaching a tele-end portion, for manually inputting a request for zooming;

a detector for detecting an operation amount of the rotational operation member; and communication means, provided in the mount portion, for transmitting the operation amount of the rotational operation member to the camera body mounted thereon.

7. The zoom lens according to claim 6, wherein an operation range of the rotational operation member starts at a wide-end portion of the optical zoom range and ends at a position excess of the tele-end portion of the optical zoom range.

8. The zoom lens according to claim 6, wherein a tele-end portion of the optical zoom range meets a wide-end portion of the trimming zoom region.

9. The zoom lens according to claim 6, wherein said zoom optical system is fixed at the tele-end portion of the optical zoom range while the zoom lens is in the trimming zoom region.

10. An electronic still camera capable of electronic zoom, the camera comprising:

a mount portion for mounting an interchangeable zoom lens having a zoom operation member for enabling zoom operation of the zoom lens, a signal output circuit for generating a predetermined signal when the zoom lens is in a tele-end portion and when the zoom operation member is operated to request longer focal length, and an operation amount detector for detecting operation amount of the zoom operation member;

communication means for communicating with the interchangeable zoom lens via the mount portion; and control means for activating an electronic zoom operation based on the predetermined signal and the operation amount of the zoom operation member.

11. The electronic still camera according to claim 10, wherein a magnification of the electronic zoom corresponds to the operation amount of the zoom operation member.

12. A silver salt film camera capable of recording trimming information, the camera comprising:

a mount portion for mounting an interchangeable zoom lens having a zoom operation member for enabling zoom operation of the zoom lens, a signal output circuit for generating a predetermined signal when the zoom lens is in a tele-end portion and when the zoom operation member is operated to request longer focal length, and an operation amount detector for detecting operation amount of the zoom operation member;

communication means for communicating with the interchangeable zoom lens via the mount portion;

means for determining a trimming print information based on the predetermined signal and the operation amount of the zoom operation member; and recording means for recording the trimming print information from the determining means onto a silver salt film loaded therein.

13. The silver salt film camera according to claim 12, wherein a value of said trimming print information is proportional to the operation amount of the zoom operation member.

14. A camera system comprising:

an interchangeable zoom lens having: a mount portion for mounting a camera body; a zoom operation member; optical zoom means for varying focal length of the zoom lens in response to operation of the zoom operation member; and signal output means provided in the mount portion for outputting a predetermined signal when the optical zoom means is in a tele-end position and when longer focal length is requested by the zoom operation member; and an electronic still camera body having an electronic imager capable of electronic zoom, the camera including: a mount portion for mounting an interchangeable zoom lens having a zoom ring, optical zoom means for varying focal length of the lens according to an operation of the zoom ring, and signal output means for outputting a predetermined signal when the zoom ring is operated excess of tele-end of the optical zoom means; communication means for communicating with the interchangeable zoom lens via the mount portion; and means for activating an electronic zoom operation in response to the predetermined signal received from the signal output means.

15. A camera system comprising:

an interchangeable zoom lens having: a mount portion for mounting a camera body; a zoom operation member; optical zoom means for varying focal length of the zoom lens in response to operation of the zoom operation member; and signal output means provided in the mount portion for outputting a predetermined signal when the optical zoom means is in a tele-end position and when longer focal length is requested by the zoom operation member; and a silver salt film camera body capable of recording trimming print information, the camera including: a mount portion for mounting an interchangeable zoom lens having a zoom ring, optical zoom means for varying focal length of the lens according to an operation of the zoom ring, and signal output means for outputting a predetermined signal when the zoom ring is operated excess of tele-end of the optical zoom means; communication means for communicating with the interchangeable zoom lens via the mount portion; means for determining a trimming print information based on the predetermined signal received from the signal output means; and recording means for recording the trimming print information onto a silver salt film loaded in the camera.

* * * * *